United States Patent [19]
Storey

[11] 3,750,469
[45] Aug. 7, 1973

[54] IONIZATION-TYPE FLOW METER

[75] Inventor: Owen Storey, Varenne-Jarey, France

[73] Assignee: Societe Industrielle d'Electronique et d'Informatique, Paris, France

[22] Filed: Aug. 3, 1971

[21] Appl. No.: 168,715

[30] Foreign Application Priority Data
Aug. 3, 1970 France .............................. 7028636

[52] U.S. Cl. .............................................. 73/194 F
[51] Int. Cl. .............................................. G01f 1/00
[58] Field of Search ..................... 173/194 E, 194 F, 173/194 M, 181

[56] References Cited
UNITED STATES PATENTS
2,627,543  2/1953  Obermaier ........................ 73/194 F
2,861,452  11/1958  Morgan .............................. 73/194 F
3,470,741  10/1969  Durbin .............................. 73/194 F Primary Examiner—Charles A. Ruehl
Attorney—Karl F. Ross

[57] ABSTRACT

Ions generated in a moving gas stream by corona discharge in the vicinity of a high-voltage anode, in the form of a wire or a disk, are intercepted by two flat or tubular collector members with closely spaced edges extending obliquely to the direction of gas flow which is perpendicular to the anode wire or disk. The oblique edges may be straight or curved, continuous or zigzagging, and extend over the entire zone in which ions may impinge upon the collectors at different flow velocities to be measured.

10 Claims, 8 Drawing Figures

OWEN STOREY
INVENTOR.

BY  *Karl F. Koss*

ATTORNEY

OWEN STOREY
INVENTOR.

BY Karl F. Ross

ATTORNEY

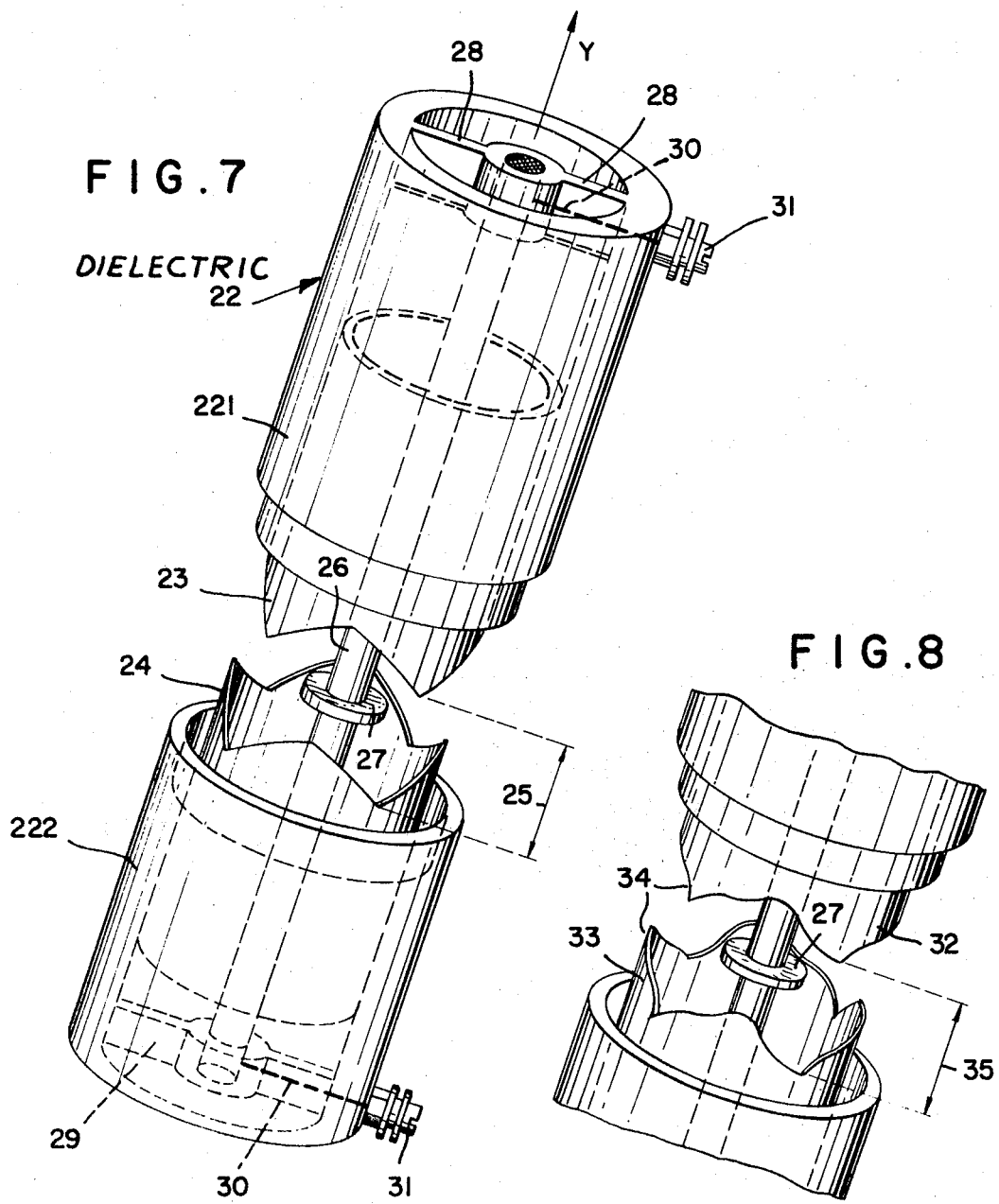

IONIZATION-TYPE FLOW METER

My present invention relates to an ionization-type flow meter, i.e., an apparatus for measuring the velocity of an ionizable fluid (generally a gas) flowing past a monitoring station which could be located in the open air (e.g., for measuring wind velocities) or in a duct traversed by the fluid. The latter arrangement has utility, for example, in an injection-control system for internal-combustion engines as disclosed in commonly owned application Ser. No. 130,615 filed Apr. 2, 1971 by Fernand R.C. Murtin; in such a system, the gas-flow rate in an air-intake duct of the engine constitutes one of the parameters to be evaluated in determining the quantity of fuel to be injected in each cycle.

In U.S. Pat. No. 3,470,741 there has been disclosed a mass-flow meter in which a positively charged corona wire or disk ionizes the surrounding gas, the ions being attracted to a negatively charged collector structure having a receiving surface parallel to the direction of gas flow. This collector structure is tapped at two locations, spaced apart in the flow direction, so as to produce two complementary output currents whose relative magnitudes depend on the flow velocity as well as on the mobility of the ions, i.e., on the density of the gas. (In a nonrarefied atmosphere, this mobility may be considered inversely proportional to density.) With the two taps located symmetrically with reference to the zone of ion emission, i.e., to the corona-generating wire or disk edge which extends transversely to the direction of flow, the two output currents are identical if the flow velocity is zero; within a relatively limited range, the difference between the magnitudes of these output currents may be regarded as proportional to flow velocity.

The collector structure of this known flow meter may be either split into two highly conductive parts or made in one piece (e.g., as a helix or as a continuous plate or tube) from resistance material. In the first instance, the two conductive parts are closely spaced plates or tubes separated by a gap which is perpendicular to the flow direction and coplanar with the anode wire or disk. With an ion stream measuring about 2 cm in the direction of flow near the cathode surface, currents on the order of 1 to 10 $\mu$A may be drawn through appropriate load resistors; as the ionizing voltage is on the order of 10,000 V, each half of the structure may be considered a current source with an internal resistance of about $10^{10}$ ohms. If the unitary cathode structure is constituted by a high-resistance collector, however, this internal resistance rarely exceeds $10^4$ ohms, which makes it more difficult to measure the relatively small output currents. On the other hand, the unitary structure offers a wider range of approximate linearity, with a permissible downstream shift on the order of centimeters (under the aforestated conditions) for the point of impingement of the median ion, as compared with the split structure where these shifts are only on the order of millimeters since the instrument output remains practically constant if the flow velocity is so large that virtually all the ions reach only one of the collector halves.

It is possible to extend the measuring range by mechanically, electrostatically or electromagnetically compensating for the downstream shift of the point of impingement by displacing either the anode or the ion stream so as to keep the median ion trained upon the gap between the two collector halves or the midpoint of the continuous cathode structure. In such a case, flow velocity is determined by the compensatory adjustment necessary to balance the two output currents. Such a modification, however, results in a rather complex system aside from the risk of excessive interference with the fluid flow to be measured.

The general object of my present invention, therefore, is to provide an improved ionization-type flow meter with an extended range of linearity which avoids the aforesaid disadvantages.

In my improved system, according to the present invention, I abandon the concept of the median ion in favor of a transverse splitting of the total ion stream into two portions respectively impinging upon two closely juxtaposed members of the collecting electrode structure (usually the cathode), the gap separating these members extending generally obliquely to the direction of fluid flow over the entire region of ion impingement upon the aligned surfaces of these members. Owing to this oblique orientation of the gap, the energy ratio of the two portions of the split ion stream (and therefore of the resultant output currents) varies progressively from a value $R$ at the upstream end of the range to the reciprocal value $1/R$ at the downstream end, with $R = \infty$ in a limiting case.

Thus, my improved system retains the advantage of high internal resistance inherent in a two-part collector while allowing an almost unlimited extension of the range of velocities to be measured. Its oblique gap, which should be symmetrical about a projection of the ion-emissive anode zone upon the collector surfaces, may be straight or curved as well as continuous or zig-zagging. A serrated shape is particularly advantageous since it allows for a nonuniform distribution of the ion concentration in the transverse direction, i.e., along the anode wire or around the disk periphery.

The above and other features of my invention will be described in detail hereinafter with reference to the accompanying drawing in which:

FIG. 7 is a perspective view of another embodiment, having a tubular cathode structure; and FIG. 8 is a fragmentary perspective view showing a modification of the system of FIG. 7.

Figure 1:
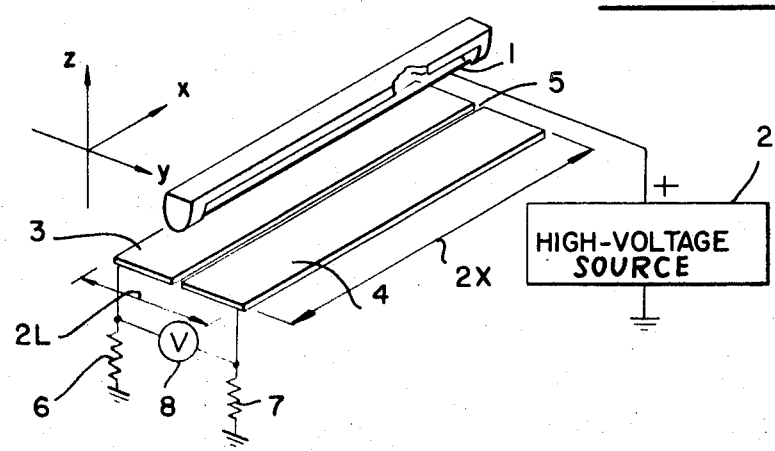
FIG. 1 is a perspective view of a mass-flow meter of the type disclosed in the above-identified patent.

The conventional flow meter illustrated in FIG. 1 comprises an anode in the form of a thin wire 1 extending in the direction $x$ of a co-ordinate system having axes $x$, $y$ and $z$. Wire 1 is aligned with a narrow gap 5 separating two rectangular collector plates 3, 4 together constituting a cathode structure, the anode 1 being connected to the positive terminal of a high-voltage source 2 whose negative terminal (ground) is returned to plates 2, 4 through respective load resistors 6, 7. A voltmeter 8, connected across the ungrounded extremities of resistances 6 and 7, measures any voltage difference present therebetween as an indication of the velocity of a flow of air or other gas past the plates 3, 4 in the direction y. Thus, the system may serve as an anemometer for gauging wind velocities in the direction +y, within a range limited by the dimension of the generated ion streams along the y axis as discussed above.

The total effective area of the cathode 3, 4 equals $4XL$ where $2X$ represents the extent of the plates along the x axis and L is the dimension of each plate along axis y (neglecting the width of the gap 5). The total ion current I collected by the cathode is given by $$I = \int_{-L}^{+L} i(y) dy \qquad (1)$$

where $i(y)$ represents the current distribution as a function of y, $i(y)dy$ being the incremental current collected between boundaries y and $y+dy$. In the state of equilibrium, this total current I is split into two equal portions given by $$\int_{-L}^{0} i(y) dy = \int_{0}^{+L} i(y) dy \qquad (2)$$

When the point of incidence of the median ion is shifted along the y axis on account of the fluid flow, the two terms of equation (2) become unequal as the 0 at the top of the first and at the bottom of the second integral is replaced by a different constant.

If the two highly conductive plates 3, 4 were replaced by a continuous layer of resistance material, such as graphite, this layer could be regarded as a potentiometer whose slider is constituted by the mobile ion stream. It can be shown that, in such a case, the distribution $i(y)$ of the ion current on the face of the collector under different operating conditions is equivalent to that obtained by concentrating the impinging ion flow upon a single point or line of ordinate $y_c$ given by the expression $$y_c = I^{-1} \int_{-L}^{+L} y i(y) dy \qquad (3)$$

The location of the virtual point of impingement may be determined in a variety of ways, as by connecting the collector in a bridge circuit whose other half is constituted by a potentiometer replacing the resistors 6, 7 of FIG. 1; with the slider of the potentiometer grounded, its equilibrium position (zero output of voltmeter 8) indicates the magnitude of $y_c$.

Figure 2:
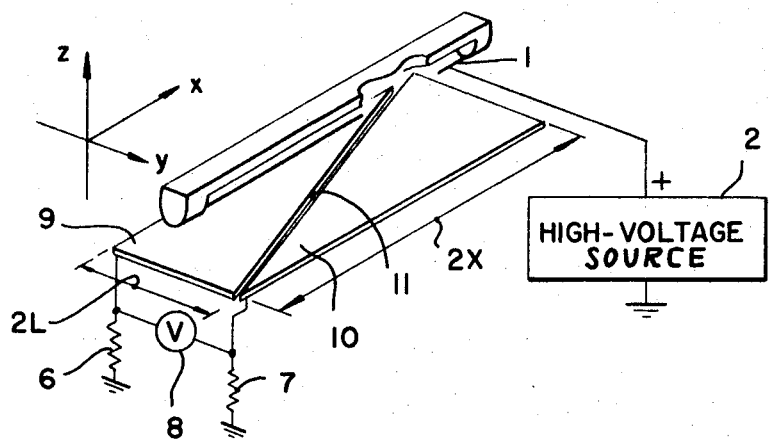
FIG. 2 is a similar view of a flow-measuring instrument embodying my present invention.

FIG. 2 shows a broadly similar flow meter embodying my present improvement, analogous elements having been designated by the same reference numerals as in FIG. 1. The two rectangular plates 3 and 4 of the conventional system have been replaced by two plates 9, 10 of complementary triangular shape separated by a diagonally extending gap 11, the combined area of these plates being again a rectangle with sides $2X$ and $2L$. The diagonal line coinciding with gap 11 has the function $x = Xy/L$.

With uniform distribution of the ion stream in the x dimension between $-X$ and $+X$, plates 9 and 10 carry respective total currents $I'$ and $I''$ whose distribution $i'(y)$ and $i''(y)$ is given by the expressions $$i'(y) = (L-y)/2L \; i(y) \qquad (4')$$

and $$i''(y) = (L+y)/2L \; i(y) . \qquad (4'')$$

On integrating between the limits $\pm L$ for y, we obtain $$I' = I(L-y_c)/2L \qquad (5')$$

and $$I'' = I(L+y_c)/2L \qquad (5'')$$

where $y_c$ has the value given in equation (3). From these expressions we derive the relationship $$I'' - I' = I y_c/L. \qquad (6)$$

Thus, the difference between the two ion currents collected on plates 9 and 10 is directly proportional to $y_c$, as in the conventional flow meter with resistive cathode structure. My improved instrument, therefore, combines the advantages of the two aforedescribed earlier systems while avoiding their drawbacks.

Figure 3:
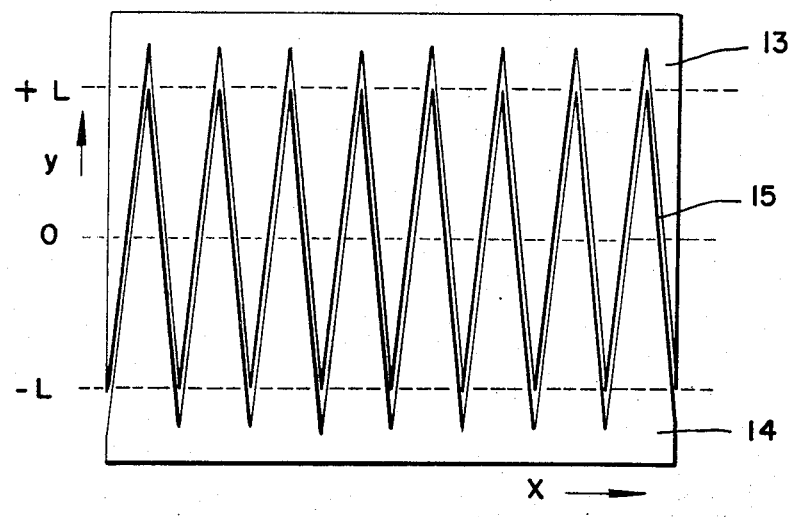
FIG. 3 is a plan view of a flat collector structure for an instrument according to the invention.

FIG. 3 shows a modified cathode structure in which the oblique gap 15 between two conductive plates 13, 14 is of zigzag shape, defining two sets of interleaved teeth in an area whose boundaries $-L$ and $+L$ are equispaced from a centerline 0 parallel to the direction x. A flow meter equipped with this type of collector, illustrated in FIG. 5, operates in the same manner as that of FIG. 2 but is less affected by possible nonuniformity of the distribution of the ion stream in the x direction.

Figure 4:
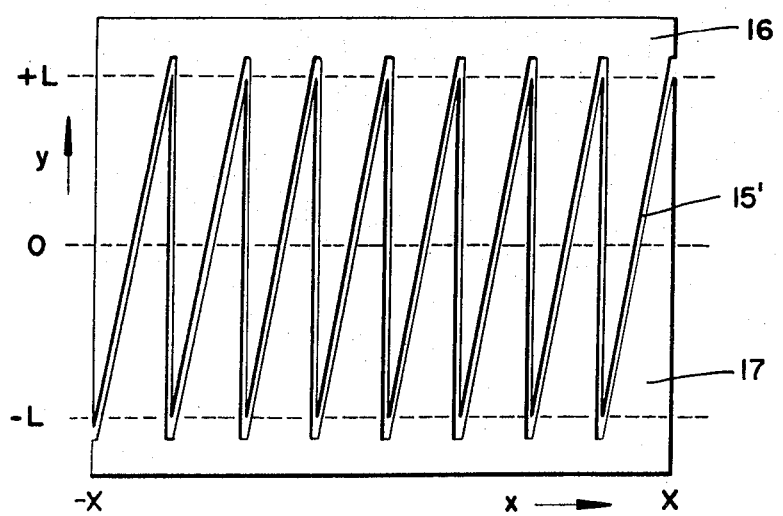
FIG. 4 is a plan view similar to FIG. 3, showing a modification.

FIG. 4 illustrates a similar collector whose plates 16, 17 are separated by a sawtooth-shaped gap 15'. The serrated line 15' may also be described as being generally oblique, with reference to the direction of fluid flow along the axis y, inasmuch as major portions of this line include an acute angle with that axis, the remaining tooth flanks being parallel to axis y and therefore at right angles to the gap 5 of FIG. 1.

Figure 5:
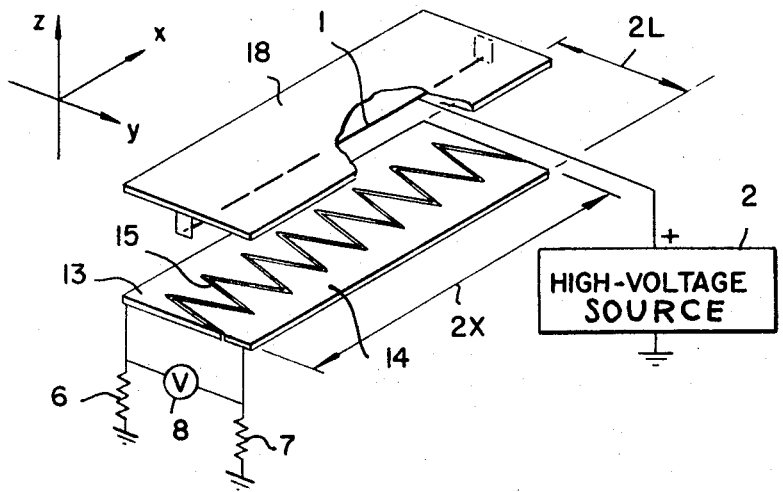
FIG. 5 is a perspective view similar to FIG. 2, showing the use of the collector of FIG. 4 in my improved flow meter.

In FIG. 5 I have also illustrated a metal plate 18 which is substantially coextensive with and parallel to the cathode structure 13, 14, lying close to the anode wire 1 on the side remote from that structure. Plate 3 is connected, in parallel with wire 1, to the positive terminal of high-voltage source 2 so that its potential substantially equals that of the wire. Owing to its smooth surface, plate 18 has no ionizing function; its presence, however, helps equalize the ion distribution over the length of wire 1.

Figure 6:
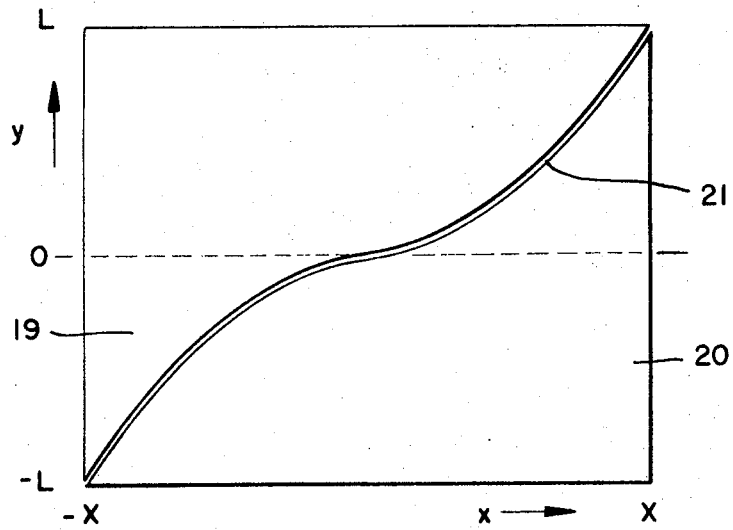
FIG. 6 is a plan view similar to FIGS. 3 and 4, showing a further modification.

Naturally, the equalizer plate 18 could also be used with cathode plates of different configuration, such as those illustrated in FIGS. 2, 4 and 6.

In FIG. 6 I have shown two plates 19, 20 of generally triangular configuration but with curved confronting edges defining a gap 21. The curvature of this gap, designed to improve the linearity of the relationship between the current difference $(I'' - I')$ and the gas velocity, has an inversion point on the centerline 0.

The aforedescribed principles are also applicable to a cylindrical flow meter, as shown in FIGS. 7 and 8, designed to measure the velocity of a confined fluid flow. The instrument of FIG. 7 comprises a tubular housing 22 of dielectric material closely surrounding a pair of cylindrical metal tubes 23, 24 with complementarily serrated flanks, separated by a gap 25 whose width has been greatly exaggerated in the drawing. The associated anode comprises a metal rod 26 carrying a disk 27 with a sharp peripheral edge in the median plane of the serrated zone, this plane bisecting the gap 25. Rod 26 is supported within shell 22 by arms 28, 29 of, preferably, aerodynamic profile to minimize their resistance to the gas flow. Leads 30 connect the ends of the rods to a pair of terminals 31 which, in turn, are tied in parallel to the positive pole of the associated high-voltage source not illustrated in this Figure.

Metal tubes 23 and 24 are grounded through resistances similar to those shown at 6 and 7 in FIGS. 2 and 5, again with a voltmeter or equivalent indicator connected thereacross.

In FIG. 7, the flanks of the interleaved teeth are helical so that the gap 25 is the equivalent of the serrated gap 15 of FIGS. 3 and 5. Naturally, the shape of this gap may be modified to conform, upon development, to any of the other configurations described such as that of FIG. 2 (one-turn helical line) or that of FIG. 4 (with alternating helical and axially extending flanks). A curvature analogous to that of FIG. 6 is also possible. In each case, all or a major portion of the gap lies skew to the tube axis.

FIG. 8 shows a pair of coaxial cathode tubes 32, 33 differing from the tubes 23, 24 by the fact that the flanks of their serrations 34, defining a gap 35, are no longer helical but are so shaped as to yield upon development a set of curves each generally similar to gap 21 of FIG. 6. Naturally, such a serration with curved flanks could also be employed in a flat cathode structure generally similar to that of FIG. 3.

The electrode structures of FIGS. 7 and 8 are centered on the $y$ axis of the co-ordinate system, with the disk 27 lying in the $xz$ plane. The angle included between that plane and the tooth flanks of FIG. 7, as well as the corresponding angles of inclination in FIGS. 2–4, should equal at least 30°, preferably 45° or more. The same applies to at least the extremities of the curved edges of FIGS. 6 and 8. The larger the range of velocities to be measured, the greater this angle should be to provide for a sufficient spacing of the boundaries $-L$ and $+L$ of the effective collector surface.

The sensitivity of the flow meter can be changed, to a certain extent, by varying the voltage applied across the anode and the cathode, provided that this voltage remains high enough to ionize the surrounding medium but low enough to prevent the striking of an arc.

The voltmeter 8 may be replaced or supplemented by an electronic integrator whose output then measures the mass of gas passing the region of ionization over a given length of time.

I claim:

1. A flow meter comprising:
   ionizing first electrode means disposed in a flow path of an ionizable fluid;
   ion-collecting second electrode means separated from said first electrode means by a space traversed by the flow of said fluid, said second electrode means comprising two closely spaced conductive members with aligned surfaces confronting said first electrode means, said surfaces being generally parallel to the direction of flow, said members being separated along said surfaces by a narrow gap extending generally obliquely to said direction of flow over the entire region of impingement of ions from said first electrode means upon said surfaces;
   a source of ionizing voltage connected across said first and second electrode means; and
   output circuitry connected across said members, said circuitry including indicator means for registering the magnitude of a voltage difference between said members as a measure of flow velocity.

2. A flow meter as defined in claim 1 wherein said first electrode means has a corona-generating zone transverse to said direction of flow, said gap being symmetrical about a projection of said zone upon said surfaces.

3. A flow meter as defined in claim 2 wherein said first electrode means comprises a thin wire transverse to said direction of flow, said surfaces lying in a plane parallel to said wire.

4. A flow meter as defined in claim 3 wherein said surfaces have a combined area of substantially rectangular outline.

5. A flow meter as defined in claim 4 wherein said gap extends substantially diagonally across said area.

6. A flow meter as defined in claim 3, further comprising a broad-surface conductor overlying said wire on the side thereof remote from said second electrode means, said conductor being connected to said source for energization at substantially the potential of said first electrode means to equalize the ion distribution along said wire.

7. A flow meter as defined in claim 2 wherein said gap is divided into generally triangular segments confronting the major part of said surfaces.

8. A flow meter as defined in claim 7 wherein said segments form interleaved teeth alternately pointing in opposite directions.

9. A flow meter as defined in claim 2 wherein said members are a pair of coaxial tubes, said gap being at least partly of helicoidal shape.

10. A flow meter as defined in claim 9 wherein said first electrode means comprises a disk centered on the axis of said tubes and having a sharp periphery constituting said corona-generating zone.

* * * * *